United States Patent [19]

Sanders et al.

[11] Patent Number: 5,121,600
[45] Date of Patent: Jun. 16, 1992

[54] TRANSPORTABLE ELECTRICAL POWER GENERATING SYSTEM FUELED BY ORGANIC WASTE

[75] Inventors: Charles F. Sanders, Irvine; Arlen W. Bell, Laguna Beach; A. Philip Bray, San Francisco, all of Calif.

[73] Assignee: Energeo, Inc., San Francisco, Calif.

[21] Appl. No.: 541,819

[22] Filed: Jun. 21, 1990

[51] Int. Cl.⁵ ............................................. F02C 3/26
[52] U.S. Cl. ............................... 60/39.464; 60/39.511; 110/245
[58] Field of Search ........... 60/39.461, 39.464, 39.511, 60/39.07, 39.02; 110/244, 245

[56] References Cited

U.S. PATENT DOCUMENTS

| | | | |
|---|---|---|---|
| 3,656,872 | 4/1972 | Jubb | 417/364 |
| 3,868,817 | 3/1975 | Marion et al. | 60/39.02 |
| 4,033,117 | 7/1977 | Smith | 60/39.464 |
| 4,187,672 | 2/1980 | Rasor | 60/39.12 |
| 4,238,925 | 12/1980 | Lowther | 60/39.461 |
| 4,253,300 | 3/1981 | Willyoung | 60/39.182 |
| 4,326,373 | 4/1982 | Giles | 60/39.511 |
| 4,476,674 | 10/1984 | Berman | 60/39.464 |
| 4,848,249 | 7/1989 | LePori et al. | 110/229 |
| 5,020,451 | 6/1991 | Maebo et al. | 110/245 |

OTHER PUBLICATIONS

Teledyne, "Ground Power Generation System", Dec. 1990.

Primary Examiner—Richard A. Bertsch
Assistant Examiner—Charles G. Freay
Attorney, Agent, or Firm—Townsend and Townsend

[57] ABSTRACT

An apparatus for providing a transportable electrical generating unit. The invention includes an electrical generation system which runs on agricultural waste or biomass. An alternative embodiment runs on crude oil. The unit is affixed to the flatbed platform of a standard trailer and is transportable by a single truck. The system is also of appropriate height to be shipped in a standard shipping container over long distances.

37 Claims, 6 Drawing Sheets

TRANSPORTABLE ELECTRICAL POWER GENERATING SYSTEM FUELED BY ORGANIC WASTE

BACKGROUND OF THE INVENTION

The present invention is related to electrical power generation. More particularly, the present invention is a transportable electrical power generating system which is fueled by organic waste or biomass.

In many populated areas of the world, there is insufficient electrical power available to provide the populace with a quality of living considered minimum by most standards. Where electricity is available, it is usually provided by gasoline, diesel, or oil-fired power generators requiring the transport of petroleum fuels to the remote location. This may be both difficult and costly. Currently, energy provisions are being sought by various entities to provide isolated and remote communities with electrical power. However, economic and geographic considerations present obstacles to conventional electrical distribution systems.

SUMMARY OF THE INVENTION

The present invention is an electrical generating unit which can be assembled and transported to remote locations and which utilizes a variety of biomass or waste materials as fuel. Efficient use of the fuel is achieved through the application of an air cycle with heated pressurized air powering a gas turbine generator set.

The system includes a furnace using a fluidized bed combustor which burns the agricultural waste in an efficient manner. Two air flow loops pass through the furnace. In a first air flow loop, combustion air is forced into the furnace at two points. At the first point, fluidizing air is introduced into the bottom of the fluid bed combustor to fluidize the particles within the fluid bed, typically alumina-silica sand. At the second point, combustion air is directed into the furnace above the fluid bed to provide a balanced draft in the furnace facilitating efficient combustion. The furnace includes a radiant heat exchanger connected to the turbine as discussed below. Gases exiting the furnace pass through a convective heat exchanger, used to preheat the air passing through the radiant heat exchanger within the furnace, and then to a cyclone which removes ash from the combustion gases. The clean combustion gases pass from the cyclone through an air preheater used to heat both the air injected into the fluid bed and the air injected above the fluid bed. The cleaned combustion gases are exhausted from the system as gases after passing through an air preheater.

A second air flow loop is used to drive the gas powered turbine generator set. The air is passed through a filter and into a compressor. Compressed air exits the compressor in a pressurized, heated state. The air from the compressor enters another heat exchanger, referred to as a recuperator, which raises the temperature of the compressed air. The recuperator uses the hot gas exiting the turbine to heat the compressed air. The compressed air passes from the recuperator to a convective heat exchanger which further raises the temperature of the compressed air through the use of the combustion gases passing from the furnace. The compressed air passes through a radiant heat exchanger within the furnace which further raises the temperature of the compressed air to a final, high pressure, temperature state as it enters the turbine. The compressed, heated air passing through the turbine causes the turbine to drive the compressor and the generator. The compressed air leaves the turbine at a lower pressure and temperature and passes through the recuperator to heat the newly compressed air leaving the compressor.

Another aspect of the present invention is the use of a "dummy" load. This load is coupled to the output of the generator and is increased or decreased in direct inverse proportion to the amount of power drawn from the system by its users. The dummy load creates a constant draw on the generator such that operation of the system, i.e., the speed of the generator and the delivery rate of the fuel, remains constant. A non-fluctuating fuel consumption permits the system to operate more efficiently by optimizing the pressures and temperatures. Maximum efficiency is achieved when the energy provided to the dummy load is used to do useful work, such as heating water for domestic or commercial uses.

Control of the system is provided by a digital microprocessor system. The microprocessor is situated in a control panel and is used to monitor temperatures and other variables in the system. The dummy load is also controlled by the microprocessor.

The system of the present invention is compact allowing it to fit on a flatbed trailer. In this way, the system can be transported by a single truck to remote areas in need of electrical power, but not within reach of a power station. Such a system can provide temporary electrical power to a remote area and can be run on biomass or agricultural waste which is available at the site. One advantage of the present invention is that it does not require steam generating water or any thermal fluid other than air. Further, since biomass or agricultural waste is used, there is no need to transport a fuel supply to a location which already has these materials available. The use of a fluid bed combustor in the furnace facilitates the use of a wide variety of biomass fuels.

For a complete understanding of the nature and advantages of the invention, reference should be made to the ensuing detailed description taken in conjunction with the accompanying drawings.

DETAILED DESCRIPTION OF THE PREFERRED EMBODIMENTS

Figure 1:
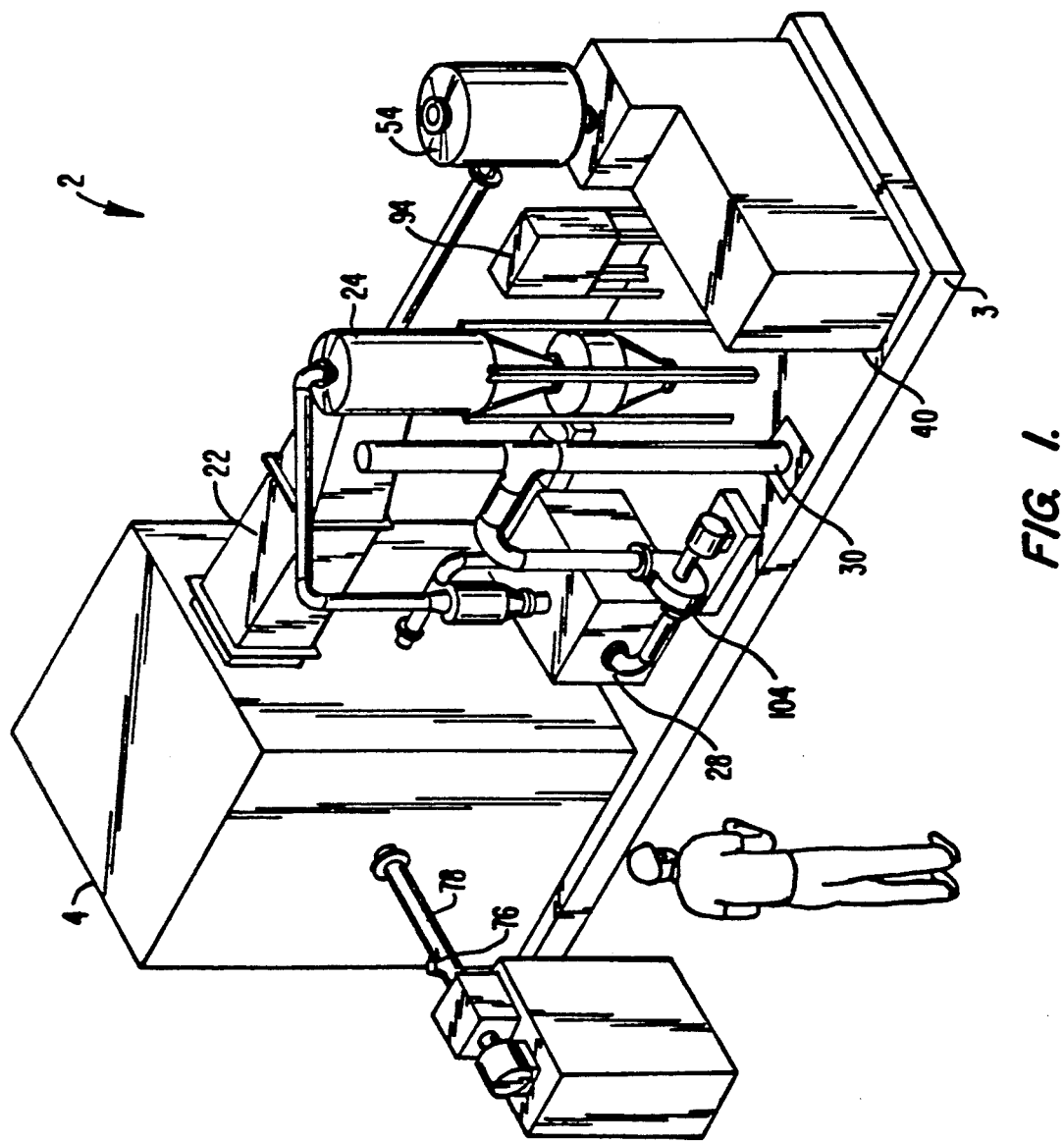
FIG. 1 is a perspective view of a transportable electrical power generating system according to the invention, but with the fuel storage bin removed for clarity.
Figure 2A:
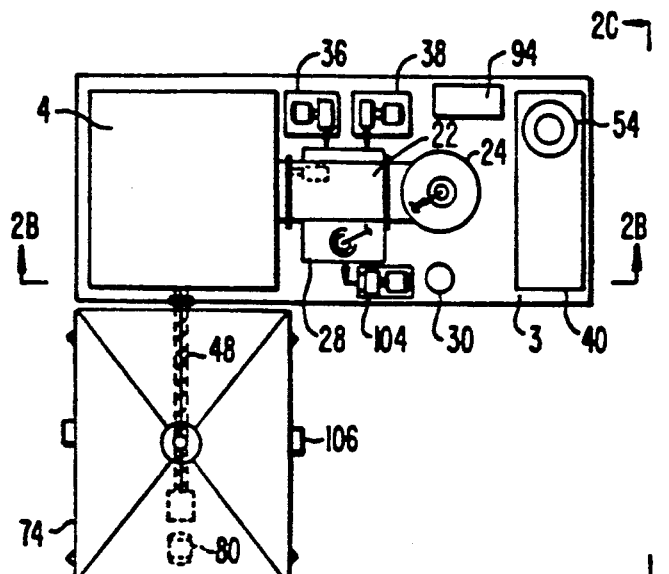
FIG. 2A is a top plan view of the system of FIG. 1 including the fuel storage bin.
Figure 2B:
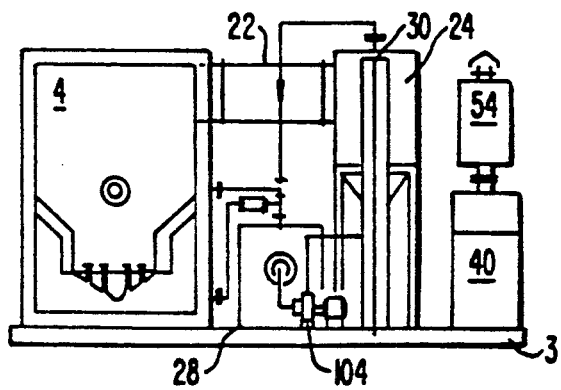
FIG. 2B is a side view of the system of FIG. 1 taken along line B—B of FIG. 2A.
Figure 2C:
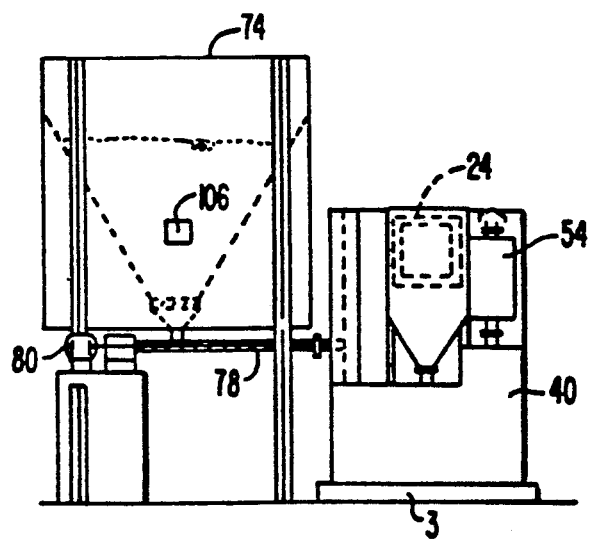
FIG. 2C is a side view taken along line C—C of FIG. 2A.
Figure 3:
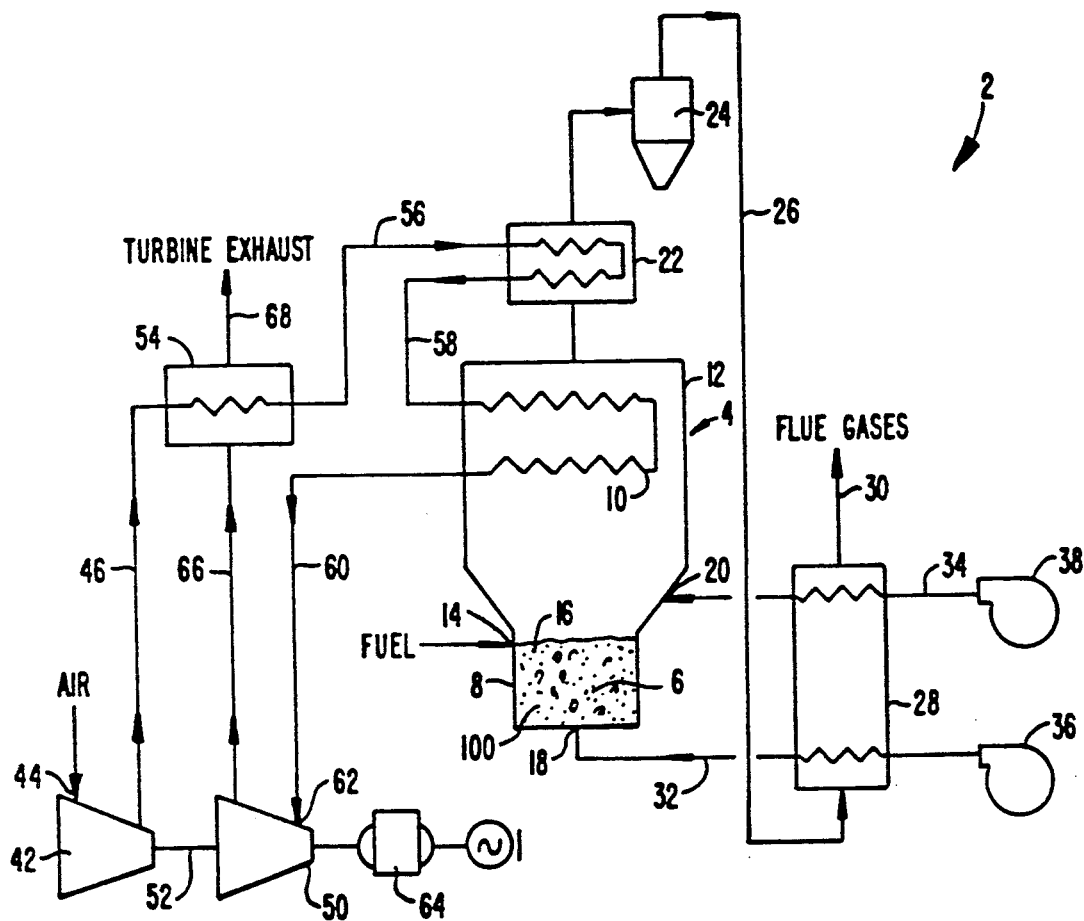
FIG. 3 is a simplified schematic representation of the transportable electrical power generating system of FIG. 1.

FIGS. 1-3 show a transportable electrical power generation system 2 sized to fit on a flatbed trailer or alternatively within a standard shipping container. The components of system 2 are affixed to a pallet 3 which allows the unit to be lifted and moved all at once. System 2 is preferably no more than about 32 feet long, 8 feet wide, and 12 feet high. System 2 includes a fluidized bed furnace 4 having a fluid bed 6, preferably containing alumina-silica sand, at its lower portion 8 and a radiant heat exchanger 10 at its upper portion 12. Fuel is introduced at a fuel port 14 situated just above the upper surface 16 of fluid bed 6. Fluid bed combustion air is introduced into the bottom of fluid bed 6 at fluid bed combustion air inlets 18. Inlets 20, situated above surface 16, provide combustion air for a balanced draft within furnace 4 and combustion of volatile materials within upper portion 12 of furnace 4.

Combustion gases pass from furnace 4 through a convective heat exchanger 22 and a cyclone separator 24 which separates ash from the combustion gases. The clean combustion gases pass from cyclone 24 through line 26 and an air preheater 28. After leaving air preheater 28, the cleaned combustion gases exit system 2 into the atmosphere through stack 30. The fluid bed combustion air and the supplementary combustion air are forced through lines 32, 34 by blowers 36, 38. Blowers 36, 38 are typically fans. However, to maximize efficiency, air ejectors may be substituted for the fans. Air ejectors do not require power provided by system 2 as do the fans. Instead, they are run with air provided on lines run directly from a compressor 42. Therefore, less of the power generated by system 2 is used internally and more power is available to the users.

Figure 4:
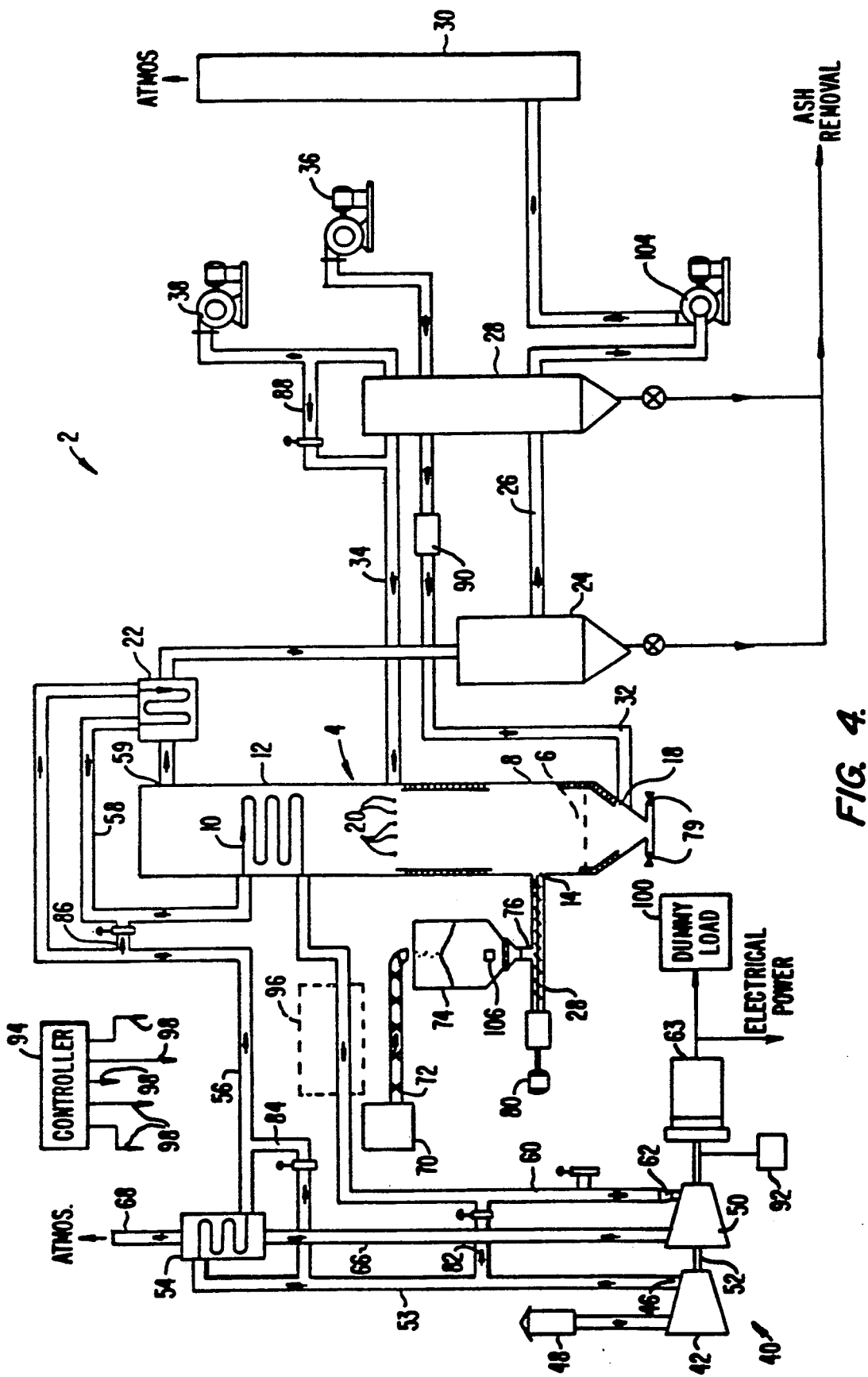
FIG. 4 is a more detailed schematic representation of the system of FIG. 1.

The fluid bed combustion air and the supplemental combustion air are preheated as they pass through air preheater 28 to increase the efficiency of system 2. In FIGS. 2A, 3 and 4, blowers 36, 38 are shown which are used in conjunction with preheater 28 to preheat the combustion air. However, in practice it would probably be preferable to use a single blower passing a single air flow through air preheater 28 and split the air flow between air preheater 28 and furnace 4.

System 2 also includes a gas turbine unit 40. Unit 40 is preferably of a conventional type such as the Solar Titan T-62-T-32-3 manufactured by Sunstrand. Unit 40 includes compressor 42 having an air inlet 44 and an air outlet 46. Ambient air enters compressor 42 through an air filter 48, is compressed by turbine 50 driving common shaft 52 and exits compressor 42 at outlet 46. The compressed air passes through a heat exchanger 54, referred to as a recuperator, which raises the temperature of the compressed air, withdrawing heat from the turbine exhaust. The compressed air passes through a line 56 to convective heat exchanger 22 which further increases the temperature of the compressed air.

The compressed air continues through line 58 and passes through radiant heat exchanger 10 raising the temperature of the compressed air to its maximum level. The heated, compressed air then passes through a line 60 and into an inlet 62 of turbine 50. The heated, compressed air passes through turbine 50 causing common shaft 52 to rotate thus driving compressor 42 and a generator 64. The exhaust from the turbine passes through a line 66 to recuperator 54 to heat the compressed air from compressor 42. The turbine exhaust is then passed into the atmosphere at exhaust point 68.

FIG. 4 illustrates system 2 in more detail than the simplified schematic of FIG. 3. Fuel, typically biomass, is ground or chopped into an appropriate size by a mill 70. The fuel then passes through a pneumatic feedline 72 into a fuel storage bin 74. The fuel storage bin 74 feeds fuel to a fuel inlet 76 along a screw feeder 78. Screw feeder 78 is connected to fuel port 14 of furnace 4 and is driven by a motor 80. Clean-out valves 79 allow residue to be removed from the base of furnace 4.

For maximum flexibility several valved bypass lines are used in the system. A valved bypass line 82 is used between lines 53 and 60 to prevent a certain portion of the compressed gas passing along line 53 to pass into line 60 without going through any of the heat exchangers. Similarly, valved bypass line 84 is used to couple line 53 to 56 to bypass recuperator 54. Valved bypass line 86 couples lines 56 and 58 to permit bypassing of convective heat exchanger 22. Finally, valved bypass line 88 couples segments of line 34 on either side of air preheater 28 to permit a portion of the air flowing through line 34 to bypass preheater 28.

When system 2 is first started, an IN DUCT START UP/BURNER 90, positioned along line 32 is activated to preheat fluid bed 6. Starter 92 drives turbine 50 and compressor 42 until the operation of the system becomes self-sustaining. Once the system is stabilized, starter 92 is shut down.

A combustor 96 shown in broken lines in FIG. 4, may be used along line 60 to burn petroleum type fuels in the event that biomass fuels are temporarily exhausted or become unavailable.

Controller 94 is a conventional microprocessor controller such as models manufactured by Honeywell, Yogogawa or Bailey. Although the present invention could be operated manually, use of controller 94 simplifies operation and improves its efficiency. Controller 94 includes various lines 98 which connect to various components including compressor 42, turbine 50, mill 70, motor 80 and so forth.

A dummy load 200 is used to maintain a constant load on gas generator unit 40. Dummy load 200 is preferably used to perform useful work, such as heating water for home or industrial uses. It is desirable to maintain a constant load on system 2 so that combustion and thermal transfer efficiencies are maximized.

Figure 5:
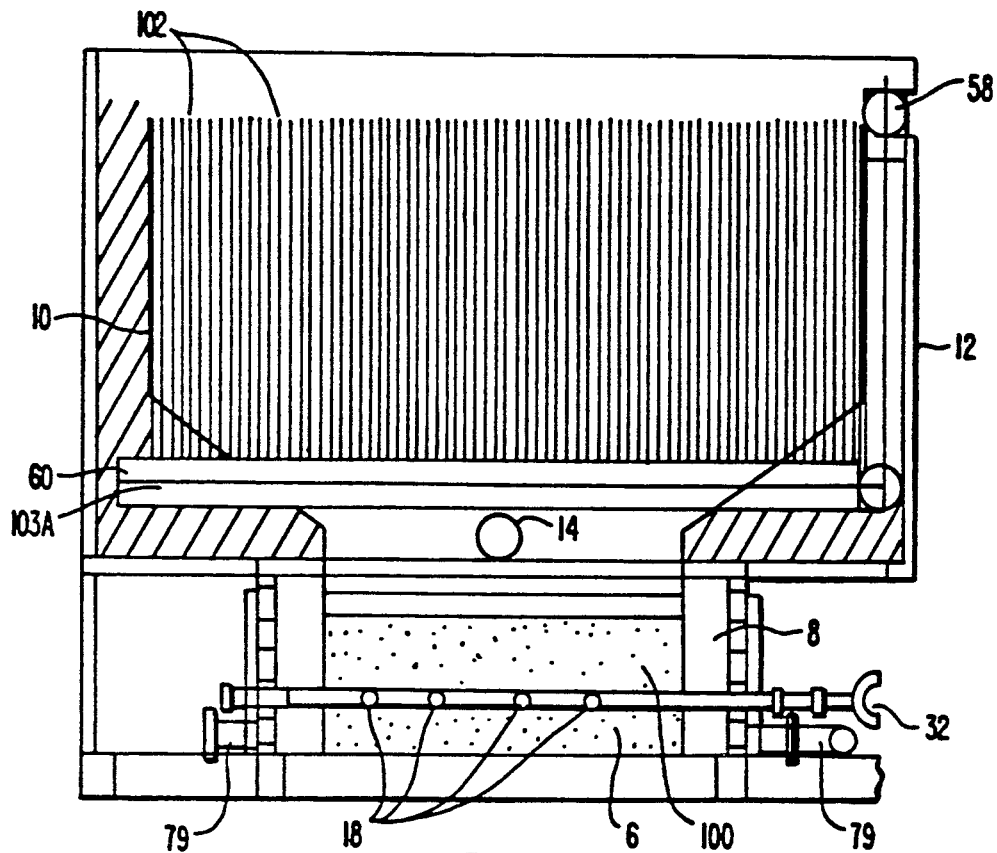
FIG. 5 is a side view of the furnace of FIG. 1.
Figure 6:
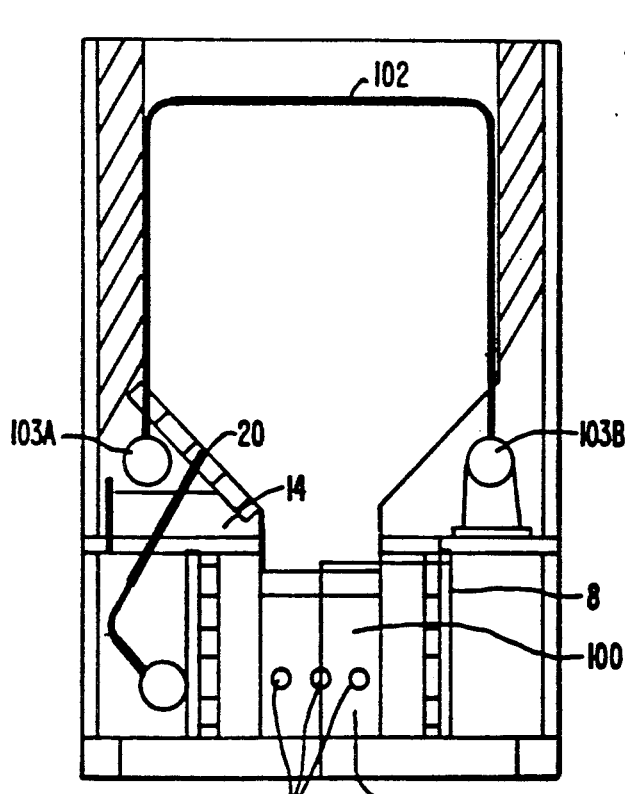
FIG. 6 is an end view of the furnace of FIG. 5.

FIGS. 5 and 6 illustrate furnace 4 in more detail than FIG. 4. Furnace 4 is rectangular in shape and measures approximately 7 feet high, 10 feet long, and 6 feet wide. The fluid bed combustor air passes into furnace 4 through inlets 18 to fluidize sand 100 in fluid bed 6. Lower portion 8 of furnace 4 is funnel shaped to better control the flow of air and activation of sand 100 to enhance the burning of fuel in furnace 4. An effective configuration which has been found efficient is to shape base 8 of furnace 4 such that it comprises a funnel which is approximately one and one-half to two feet high. About one-third of the total air flow passes through inlets 18 while about two-thirds of the total air passes through inlets 20. This ratio is adjustable by controller 94 depending on the type of fuel as well as other variables The furnace configuration is specifically designed to burn the fuel in two stages. As the fuel is input at fuel port 14, the non-volatile or solid portions are burned in fluid bed 6 at base 8 of furnace 4 while the volatile or gaseous portions rise above fluid bed 6 and are burned in the main body of furnace 4. The burning of the gaseous portions is enhanced by the upper air flow from inlets 20 while the burning of the solid portions is enhanced by the air flow from inlets 18.

The combination of dividing the air flow between fluid bed combustion air passing through inlets 18 and the supplemental combustion air passing through inlets 20, coupled with the funnel shape of lower portion 8 improves the efficiency of furnace 8. This is especially true since furnace 4 is designed to be used with various types of fuels permitting the percentage of the air passing through inlets 18, 20 to be adjusted for maximum efficiency.

Radiant heat exchanger 10 includes a series of radiant tubes 102 connected at either end to a pair of headers 103. A first header 103A receives an air flow from convective heat exchanger 22 (not shown) at line 58. The air passes through radiant tubes 102 which comprise radiant heat exchanger 10 to a second header 103B. The air in radiant tubes 102 is heated by furnace 4. From header 103B, the heated air leaves furnace 12 via line 60 and is passed to turbine 50.

Headers 103 are situated outside of radiant heat exchanger 10. In this way, if a leak develops in any of radiant tubes 102, the outside casing of furnace 4 can be opened and the leaking tube can be removed and sealed off from system 2. In a remote location where system 2 is intended to be used, this repair can be made easily so that system 2 need not be incapacitated for long periods due to a minor leak in one of radiant tubes 102.

Although furnace 4 is preferably rectangular in shape, there are alternative embodiments which may be appropriate. For example, furnace 4 could be circular. This would alter the configuration of radiant heat exchanger 22 as well as headers 103. However, a circular furnace would function in a similar manner to the rectangular furnace shown.

The operation of system 2 will now be discussed. Air is pumped through lines 32, 34 and preheater 28 prior to being introduced into furnace 4 at inlets 18, 20. The fluid bed combustion air passing through inlet 18 fluidizes sand 100. It is also used in the combustion of nonvolatile portions of the fuel entering furnace 6. The supplemental combustion air passing through inlets 20 is used primarily in the combustion of the volatile portions of the fuel and in the balanced draft provided by induction fan 104. The combustion gas is passed through a path consisting of furnace 4, outlet port 59, convective heat exchanger 22, and cyclone 24. Cyclone separator 24 removes fly ash from the fluid gas and passes the remaining fluid gas through line 26 to air preheater 28. The exhaust gases are forced through stack 30 by a blower 104 into the atmosphere.

Atmospheric air is input to system 2 through a filter 48 and into compressor 42 where it is compressed. The compressed air then passes through line 53 and recuperator 54. At full power, air leaves outlet 46 at about 210° C. Recuperator 54 greatly increases the temperature of the compressed air to about 293° C. The compressed air then passes through line 56 and through convective heat exchanger 22 where the temperature of the air increases to about 732° C. The compressed air, passes through radiant heat exchanger 10 and is again heated before entering inlet 62 of turbine 50 at about 871° C. The air, at a lower pressure and temperature, exits turbine 50 at a temperature of about 638° C. and passes through recuperator 54 to heat the compressed air passing from line 53 to line 56 through recuperator 54. The turbine exhaust air then passes into the atmosphere at a temperature of about 260° C. at exhaust point 68.

Fuel in bin 74 is fed into furnace 4 through screw feeder 78 of fuel port 14. An agitator 106 in bin 74 maintains a smooth fuel flow.

Sand 100 is preferably an alumina silica sand with a high fusion temperature and heat capacity. The heat capacity, uniformity of the fluid bed, and the preheating of the fluid bed combustion air passing through inlets 18 permit the use of a variety of fuels of varying and fluctuating qualities. For example, the heating value, ash content and moisture content of wood chips and rice hulls, two typical fuels, vary greatly. Stable operation of combustion varies a great deal depending upon the fuel and the condition in which it is received.

Figure 7:
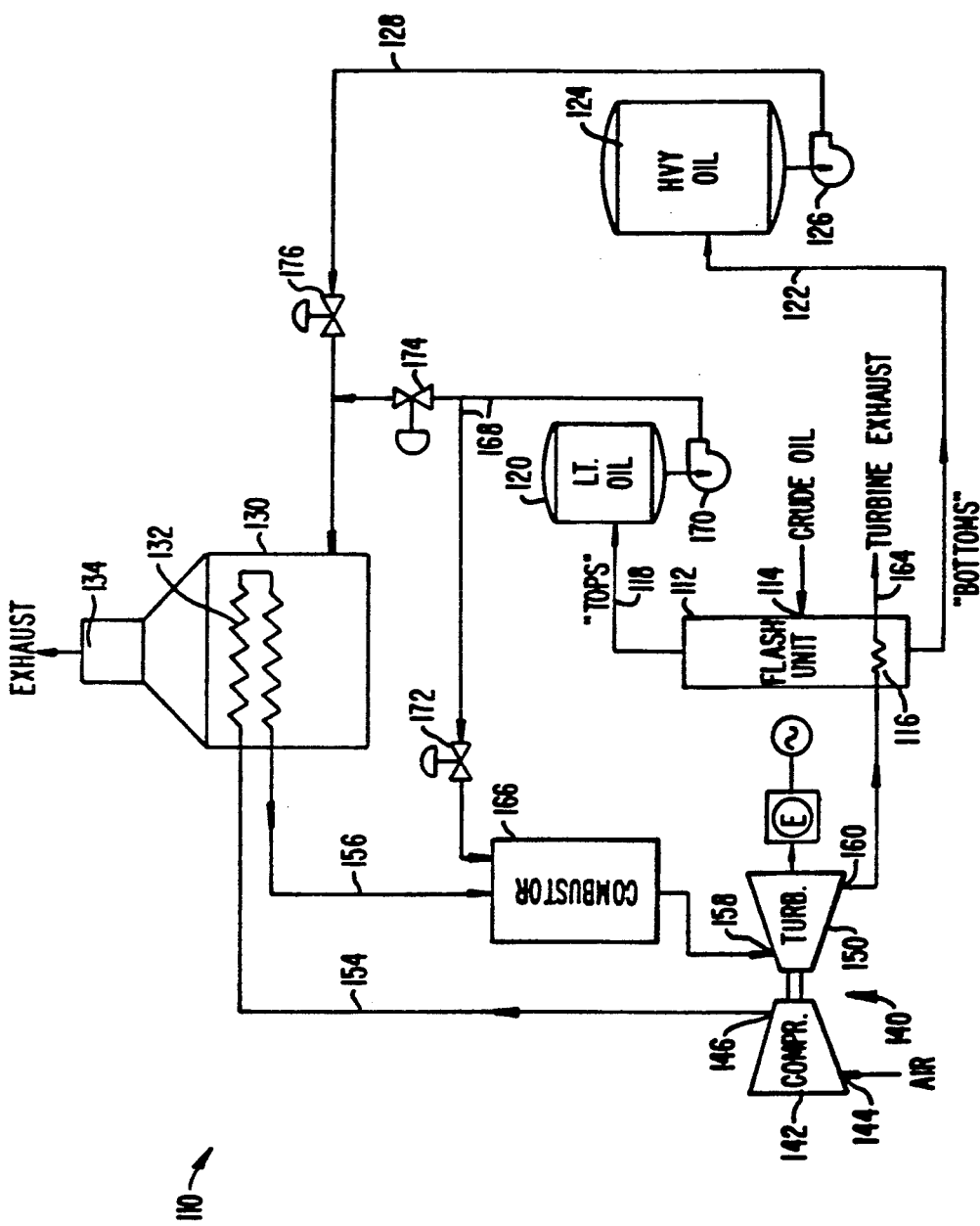
FIG. 7 is a simplified schematic representation of an alternative embodiment of the transportable electrical power generating system of FIG. 1 fueled by crude oil.

FIG. 7 illustrates, in simple form, system 2 modified to use crude oil as a source of fuel. A system 110 includes a flash vaporization unit 112 or alternatively a distillation column, to which crude oil is supplied at in inlet 114. Flash unit 112 heats the crude oil and vaporizes the lighter fractions using the heat of the turbine exhaust passing through a heat exchanger 116. The lighter fractions or "tops" pass from flash unit 112 through a line 118 into a light oil storage container 120. The heavier fraction or "bottoms" pass from flash unit 112 through a line 122 into a heavy oil storage container 124. A pump 126 pumps heavy oil from container 124 through a line 128 to a furnace 130 for burning. Heat provided by the burning of the heavy oil within furnace 130 heats the air within a heat exchanger 132. The exhaust gas is passed from furnace 130 at a stack 134.

A gas turbine generator unit 140 includes a compressor 142 having an air inlet 144 and an air outlet 146. Unit 140 also includes a turbine 150 coupled to compressor 142 by common shaft 152. Air exits compressor 142 at air outlet 146 and passes through a line 154. The compressed air in line 154 passes through heat exchanger 132 in furnace 130 and then through a line 156 to enter turbine 150 at turbine inlet 158. The turbine exhaust passes from a turbine outlet 160 through a line 162 and enters heat exchanger 116 within flash unit 112. After heating the crude oil within flash unit 112 the turbine exhaust exits system 110 at exhaust 164.

System 110 also includes a combustor 166 which is used to burn the light fuel or tops stored in container 120. The light fuel is pumped through a line 168 by a pump 170 into combustor 166. There, the heated compressed air from line 156 combines with the products of combustion of the light oil fractions to pass from combustor 166 to inlet 158 of turbine 150. In this way crude oil is used with a gas turbine in a most advantageous fashion by utilizing the products of combustion from the tops, which are generally relatively clean, while indirectly using the products of combustion of the bottoms within furnace 130 to preheat the air passing through the turbine. This system greatly reduces the passing of minerals and other impurities present in the crude oil into turbine 150. This eliminates any requirement for chemically processing the crude oil to remove such impurities while fully utilizing both the lighter, clean fractions and the heavier, dirty fractions containing substantially all the impurities which may damage turbine 150.

By including combustor 166, the temperature of furnace 130 need not be as high as it would otherwise need to be to provide hot enough air to drive turbine 150. This reduces corrosion and ash problems which otherwise occurs due to the contaminants in the bottoms or heavy portions of the crude oil. Various valves 172, 174, 176 are provided to adjust the flow of the tops to combustor 166 and when desired, furnace 130.

Systems 2, 110 are preferably of modularized construction sized to fit on a flatbed trailer with dimensions of approximately 32 feet long, 8 feet wide and 12 feet high. For example, turbine generator unit 40 forms a single module as does furnace 4. Modular construction permits a module containing a faulty component to be removed and replaced without fixing the component on-site.

In general, to those skilled in the art to which this invention relates, many changes in construction and widely differing embodiments in the application of the present invention will suggest themselves without departing from its spirit and scope. For instance, the blowers could be replaced with air ejectors which work efficiently to move air flow in and out of furnace 4. Likewise, with the system for burning crude oil, a lower furnace with oil burners might be substituted for the fluid bed. Thus, the disclosures and descriptions herein are purely illustrative and are not intended to be in any sense limiting. The scope of the invention is set forth in the appended claims.

What is claimed is:

1. A transportable electrical power generating system which is fueled by agricultural waste, comprising:
   a turbine for generating rotary mechanical power from a stream of heated air received by said turbine wherein said turbine emits heated air during operation;
   a compressor driven by said turbine for pressurizing ambient air;
   a generator for converting said rotary mechanical power provided by said turbine to electricity;
   a recuperator in fluid connection with said compressor and said turbine for receiving compressed air supplied by said compressor and which heats said compressed air with energy supplied by said exhaust air received from said turbine;
   a first convective heat exchanger for transferring heat between air received from said recuperator and air being transmitted from said first heat exchanger;
   a furnace for burning agricultural waste to produce heat including,
   a furnace chamber having a base and a top;
   a second radiant heat exchanger within said chamber for transferring heat between air received from said first heat exchanger and said heated stream of air transmitted to said turbine;
   first means for providing a first air flow into said base of said furnace chamber; and
   second means positioned between said base and said top for providing a second air flow which maintains a balanced draft in said furnace chamber to direct heat flow to said second heat exchanger;
   a cyclone separator for removing fly ash from flue gas exiting said furnace;
   an air preheater for preheating air contained in said first air flow;
   exhaust means for exhausting the system of fumes; and
   a pallet to which components of the system as affixed, said pallet of a size and configuration suitable for carrying on a flatbed trailer for transporting said system to remote locations.

2. The system of claim 1 wherein said exhaust means comprises:
   a stack out of which said fumes flow; and
   means for blowing said fumes through said stack.

3. The system of claim 2 wherein said means for blowing is a fan.

4. The system of claim 2 wherein said means for blowing is an air ejector.

5. The system of claim 4 wherein the system has dimensions not exceeding 12 feet high, 8 feet wide, and 32 feet long.

6. The system of claim 1 further comprising fuel storage means connected to said furnace for holding the agricultural waste before it enters said furnace.

7. The system of claim 1 further comprising an inlet air filter connected to said compressor for filtering said ambient air before entry to said compressor.

8. The system of claim 1 wherein said first means is a fan for providing said first air flow.

9. The system of claim 1 wherein said first means is an air ejector for providing said first air flow.

10. The system of claim 1 wherein said second means is a fan for providing said second air flow.

11. The system of claim 1 wherein said second means is an air ejector for providing said second air flow.

12. The system of claim 1 further comprising load compensation means connected to an output of said generator for stabilizing operation of the system by maintaining a constant load output and an associated constant fuel input supply to the system such that when users increase power consumption a load provided by said load compensation means is reduced and when users decrease power consumption said load provided by said load compensation means is increased.

13. The system of claim 12 wherein said load compensation means performs a useful function with power received by said load compensation means.

14. The system of claim 1 further comprising a microprocessor based controller for controlling operations within the system.

15. The system of claim 1 wherein said base of said furnace is funnel shaped to concentrate said first air flow in said furnace toward the fuel deposited in said furnace.

16. The system of claim 1 further comprising combustion means connected between said furnace and said turbine for burning petroleum fuel wherein energy provided by burning said petroleum fuel is used to drive said turbine.

17. A transportable electrical power generating system which is fueled by crude oil, comprising:
   a turbine for generating rotary mechanical power from a stream of heated air received by said turbine wherein said turbine emits heated air during operation;
   a compressor driven by said turbine for pressurizing ambient air;
   a generator for converting said rotary mechanical power provided by said turbine to electricity;
   vaporization means for receiving the crude oil and heated air from said turbine wherein energy provided by said heated air is used to separate an impure portion of the crude oil from a substantially pure portion of the crude oil such that the impure portion is transmitted from a bottom portion of said vaporization means and said substantially pure portion of the crude oil is transmitted from a top portion of said vaporization means;
   a furnace for burning said impure portion of the crude oil to produce heat including, a furnace chamber having a base and a top;

a first radiant heat exchanger for transferring heat between air received from said compressor and said heated stream of air transmitted to said turbine;

combustion means connected between said first heat exchanger and said turbine for providing combustion of said substantially pure portion of the crude oil such that energy obtained from combustion powers said turbine;

first oil storage means for receiving said substantially pure portion of the crude oil and providing said pure portion to said combuster to be burned;

second oil storage means for receiving said impure portion of the crude oil and providing said impure portion to said furnace to be burned; and a pallet to which components of the system are affixed, said pallet of a size and configuration suitable for carrying on a flatbed trailer for transporting said system to remote locations.

18. The system of claim 17 wherein said vaporization means is a distillation column which separates clean light ends of the crude oil as the crude oil is fed into the system through a distillation process.

19. The system of claim 17 wherein said vaporization means is a flash vaporization unit which separates clean light ends of the crude oil as the crude oil is fed into the system through a vaporization process.

20. The system of claim 17 further comprising a microprocessor based controller for controlling operations within the system.

21. A transportable electrical closed-loop power generating system for providing electrical power including components arranged in a plurality of modules which fit together on a pallet, said pallet being of a size and configuration suitable for carrying on a flatbed trailer, the system comprising:

a turbine for generating rotary mechanical power from a stream of heated air received by said turbine wherein said turbine emits heated air during operation;

a compressor driven by said turbine for pressurizing ambient air;

a generator for converting said rotary mechanical power provided by said turbine to electricity; and a furnace for burning fuel to produce heat, including, a chamber including a base and a top and being of a particular size such that combustion within said chamber occurs in two stages, a first stage for non-volatile material in a fluid bed at said base of said chamber and a second stage for volatile material above said fluid bed;

a radiant heat exchanger within said chamber for transferring heat to a stream of air transmitted to said turbine;

first air flow means for providing a first air flow into said base of said chamber; and second air flow means for providing a second air flow which maintains a balanced draft in said chamber to direct heat flow to said heat exchanger, wherein said modules are configured such that any particular module is easily removable and replaceable without replacing or substantially altering any other of said modules.

22. The system of claim 21 wherein said chamber is funnel shaped at said base increasing concentration and control of said first air flow into said base.

23. The system of claim 22 wherein said funnel shape base includes a cylindrical bottom portion extending approximately 2 feet in height.

24. The system of claim 21 wherein said chamber is approximately 7 feet high.

25. The system of claim 21 wherein said exhaust means comprises:

a stack out of which said fumes flow; and means for blowing said fumes through said stack.

26. The system of claim 21 wherein said first air flow means is a fan for providing said first air flow.

27. The system of claim 21 wherein said first air flow means is an air ejector for providing said first air flow.

28. The system of claim 21 wherein said second air flow means is a fan for providing said second air flow.

29. The system of claim 21 wherein said second air flow means is an air ejector for providing said second air flow.

30. The system of claim 21 wherein the system has dimensions not exceeding 12 feet high, 8 feet wide, and 20 feet long.

31. The system of claim 21 further comprising an inlet air filter connected to said compressor for filtering said ambient air before entry to said compressor.

32. The system of claim 21 further comprising load compensation means connected to an output of said generator for stabilizing operation of the system by maintaining a constant load output and an associated constant fuel input supply to the system such that when users increase power consumption a load provided by said load compensation means is reduced and when users decrease power consumption said load provided by said load compensation means is increased.

33. The system of claim 32 wherein said load compensation means performs useful functions with power received by said load compensation means.

34. The system of claim 21 further comprising a microprocessor based controller for controlling operations within the system.

35. The system of claim 21 further comprising combustion means connected between said furnace and said turbine for burning petroleum fuel wherein energy provided by burning said petroleum fuel is used to drive said turbine.

36. The system of claim 21 wherein the fuel burned by said furnace is agricultural waste.

37. The system of claim 36 further comprising fuel storage means connected to said furnace for holding the agricultural waste before it enters said furnace.

* * * * *